(12) United States Patent
Baker

(10) Patent No.: US 8,198,555 B2
(45) Date of Patent: Jun. 12, 2012

(54) MULTI-POSITION SWITCH ASSEMBLY FOR CONTROLLING A VEHICLE DISPLAY SCREEN

(75) Inventor: Alex W. Baker, Ostrander, OH (US)

(73) Assignee: Honda Motor Co., Ltd, Tokyo (JP)

( * ) Notice: Subject to any disclaimer, the term of this patent is extended or adjusted under 35 U.S.C. 154(b) by 423 days.

(21) Appl. No.: 12/428,075

(22) Filed: Apr. 22, 2009

(65) Prior Publication Data

US 2010/0270133 A1 Oct. 28, 2010

(51) Int. Cl.
*H01H 9/26* (2006.01)

(52) U.S. Cl. .................. 200/5 A; 200/11 R

(58) Field of Classification Search .............. 200/4, 5 A, 200/6 A, 11, 18, 11 R; 341/20, 21
See application file for complete search history.

(56) References Cited

U.S. PATENT DOCUMENTS

| | | | |
|---|---|---|---|
| 5,430,262 A * | 7/1995 | Matsui et al. ................. | 200/5 A |
| 5,510,810 A | 4/1996 | Nishijima et al. | |
| 5,621,196 A * | 4/1997 | Nishijima et al. ............ | 200/6 A |
| 5,847,335 A * | 12/1998 | Sugahara et al. ................. | 200/4 |
| 5,952,628 A * | 9/1999 | Sato et al. .......................... | 200/4 |
| 6,080,941 A * | 6/2000 | Yokobori ....................... | 200/6 A |
| 6,162,999 A * | 12/2000 | Ishikawa et al. ............... | 200/6 A |
| 6,396,006 B1 * | 5/2002 | Yokoji et al. ....................... | 200/4 |
| 7,091,430 B1 * | 8/2006 | Haizima et al. ............... | 200/6 A |
| 7,242,390 B2 | 7/2007 | Bader et al. | |
| 7,342,187 B2 * | 3/2008 | Yamaguchi .................... | 200/14 |
| 7,390,985 B2 | 6/2008 | Onodera | |
| 7,436,398 B2 | 10/2008 | Yuasa et al. | |
| 7,462,787 B1 * | 12/2008 | Kang et al. ......................... | 200/4 |
| 7,507,919 B2 * | 3/2009 | Sugahara et al. .............. | 200/6 A |
| 2004/0132498 A1 | 7/2004 | Clabunde et al. | |
| 2004/0189595 A1 | 9/2004 | Yuasa et al. | |
| 2004/0217938 A1 | 11/2004 | Abe et al. | |
| 2004/0233159 A1 | 11/2004 | Badarneh | |
| 2007/0159452 A1 | 7/2007 | Basche | |

FOREIGN PATENT DOCUMENTS

| | | |
|---|---|---|
| JP | 08-212877 | 8/1996 |
| JP | 10-050178 | 2/1998 |

* cited by examiner

*Primary Examiner* — Xuong Chung Trans
(74) *Attorney, Agent, or Firm* — Rankin Hill & Clark LLP

(57) ABSTRACT

A multi-position switch assembly for controlling a vehicle display screen includes a rocker configured to spherically rotate. The rocker defines an interior space. A pushbutton extends through the interior space of the rocker. The pushbutton is fixed with respect to rotation and is movable linearly relative to the rocker. An encoder detects a rotation angle of the rocker. A first input device is actuated by the spherical movement of the rocker. A second input device is actuated by the linear movement of the pushbutton.

21 Claims, 11 Drawing Sheets

MULTI-POSITION SWITCH ASSEMBLY FOR CONTROLLING A VEHICLE DISPLAY SCREEN

BACKGROUND

Exemplary embodiments herein relate to a multi-position switch for controlling an image on a display screen of a display system, such as a display system mounted on a vehicle.

Some vehicle display systems simply employ touch screens; however, interacting with a touch screen can cause a driver to take his or her eyes off the road for too long. To improve safety, the display can be provided with an operating member or multi-position switch configured to move a cursor on the display screen and make a selection among a plurality of processing items or menus displayed on the display screen. Some such operating members are displaceable in an axial direction and rotatable around the axial direction. Selection is made among the various processing items on the display screen in accordance with an inputting operation by the operating member. With this conventional operating member, the slidable action and the rotatable action are effected through a one-piece member. Unfortunately, this can result in an inadvertent input or entry. For example, if only one of the slide or rotation operations was intended by the operator, the intended operation can cause an additional unexpected operation, such as the other of rotating or sliding of the operating member, respectively. Obviously, this poses an unfavorable problem from the viewpoint of operability. While employing an operating member or multi-position switch on the display can decrease look-down time and increase safety, the current designs are too complex and expensive.

SUMMARY

In accordance with one aspect, a multi-position switch assembly for controlling a vehicle display screen comprises a rocker configured to spherically rotate. The rocker defines an interior space. A pushbutton extends through the interior space of the rocker. The pushbutton is fixed with respect to rotation and is movable linearly relative to the rocker. An encoder detects a rotation angle of the rocker. A first input device is actuated by the spherical movement of the rocker. A second input device is actuated by the linear movement of the pushbutton.

In accordance with another aspect, a multi-position switch assembly for controlling a vehicle display screen comprises a housing. A ring is positioned within the housing and is configured to rotate therein. An annular rocker is at least partially arranged within the housing, the rocker at least partially surrounding the ring. The rocker is configured to rotate with the ring and tilt in a predetermined direction about the ring. A pushbutton extends through the rocker and ring. The pushbutton is fixed with respect to rotation and is movable linearly relative to the rocker. A rotary encoder is at least partially surrounded by the ring for detecting a rotation angle of the rocker. A plurality of first momentary-contact switches are provided. Each first momentary-contact switch is actuated by a tilting movement of the rocker. A second momentary-contact switch is actuated by the linear movement of the pushbutton.

In accordance with yet another aspect, a multi-position switch assembly for controlling a vehicle display screen comprises an annular rocker and a ring including at least one guide. The rocker is configured to spherically rotate about the ring via the at least one guide. The ring is positioned within the rocker for rotation therewith. A pushbutton is fixed with respect to rotation and is movable linearly relative to the rocker. An encoder detects a rotation angle of the rocker.

In accordance with still yet another aspect, a multi-position switch assembly for controlling a vehicle display screen comprises an annular rocker including an inner surface. A ring is positioned within the rocker for rotation therewith. The ring includes a generally convex outer surface having at least one guide. The inner surface of the rocker is configured to matingly engage the outer surface of the ring such that the rocker spherically rotates about the ring via the at least one guide. A pushbutton is fixed with respect to rotation and movable linearly relative to the rocker. An encoder detects a rotation angle of the rocker.

DETAILED DESCRIPTION

Figure 1:
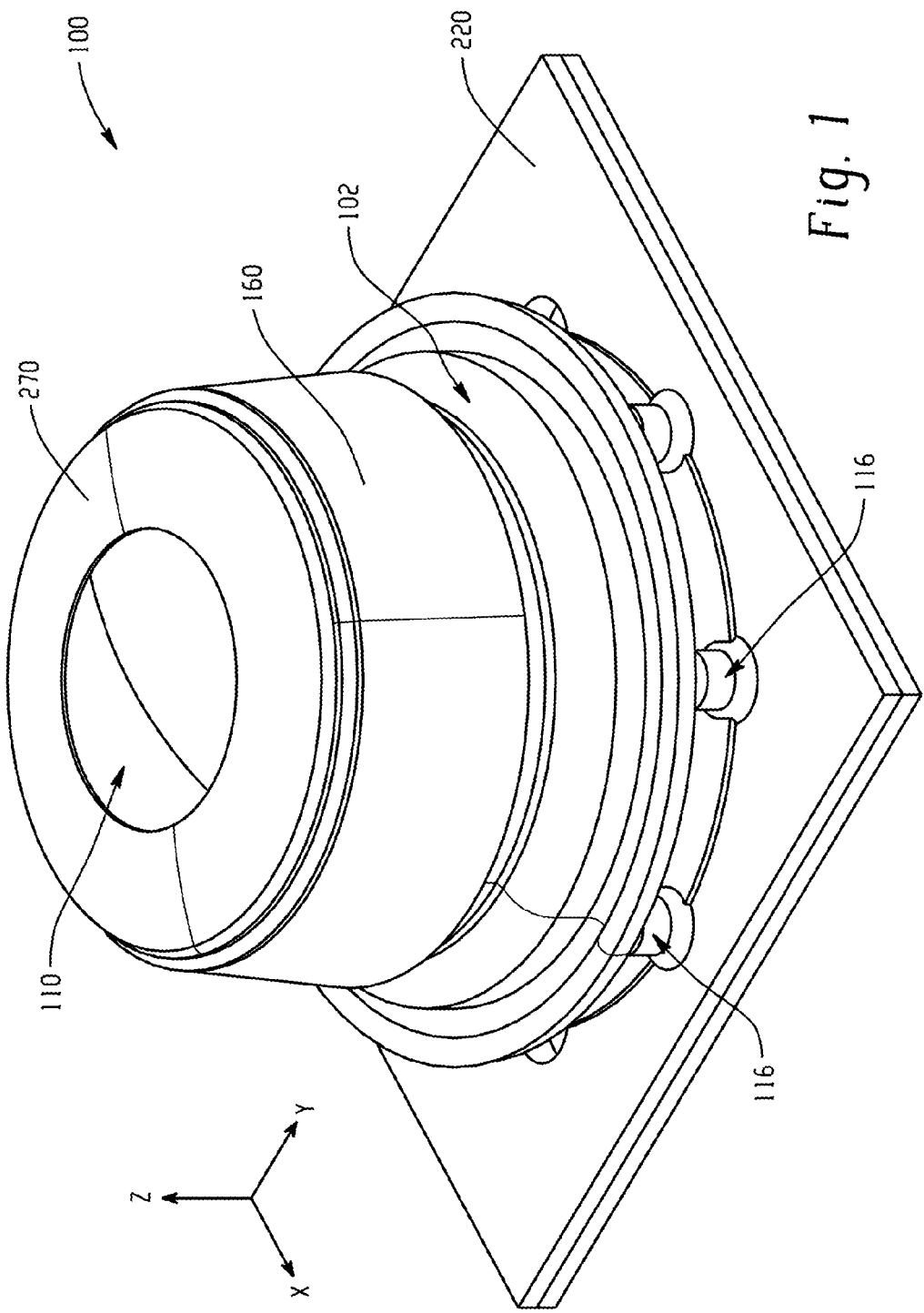
FIG. 1 is a perspective view of an exemplary embodiment of a multi-position switch assembly for controlling a display screen, such as a navigation system mounted on a vehicle.

It should, of course, be understood that the description and drawings herein are merely illustrative and that various modifications and changes can be made in the structures disclosed without departing from the present disclosure. It will also be appreciated that the various identified components of the multi-position switch disclosed herein are merely terms of art that may vary from one vehicle manufacturer to another and should not be deemed to limit the present disclosure. All references to direction and position, unless otherwise indicated, refer to the orientation of the multi-position switch illustrated in the drawings and should not be construed as limiting the claims appended hereto. Like numerals refer to like parts throughout the several views.

Referring now to the drawings wherein the showings are for purposes of illustrating one or more embodiments only and not for purposes of limiting the same, FIGS. 1-4 illustrates an exemplary embodiment of a multi-position switch assembly 100 for controlling a display system (not shown) mounted on a vehicle. As will be discussed in greater detail below, the multi-position switch assembly 100 generally comprises a rocker 102 configured to spherically rotate about one of an X-axis and a Y-axis. The rocker defines an interior space 106. A pushbutton 110 extends through the interior space of the rocker. The push button is fixed with respect to rotation relative to the rocker 102 and is movable linearly with respect to the rocker 102 in a direction of a Z-axis. An encoder 114 is provided for detecting a rotational angle of the rocker 102. A first input device or plurality of input devices 116 (e.g., a switch or switches) are actuated by the spherical movement of the rocker. A second input device 118 (e.g., a switch) is actuated by the linear movement of the pushbutton 110.

Figure 3:
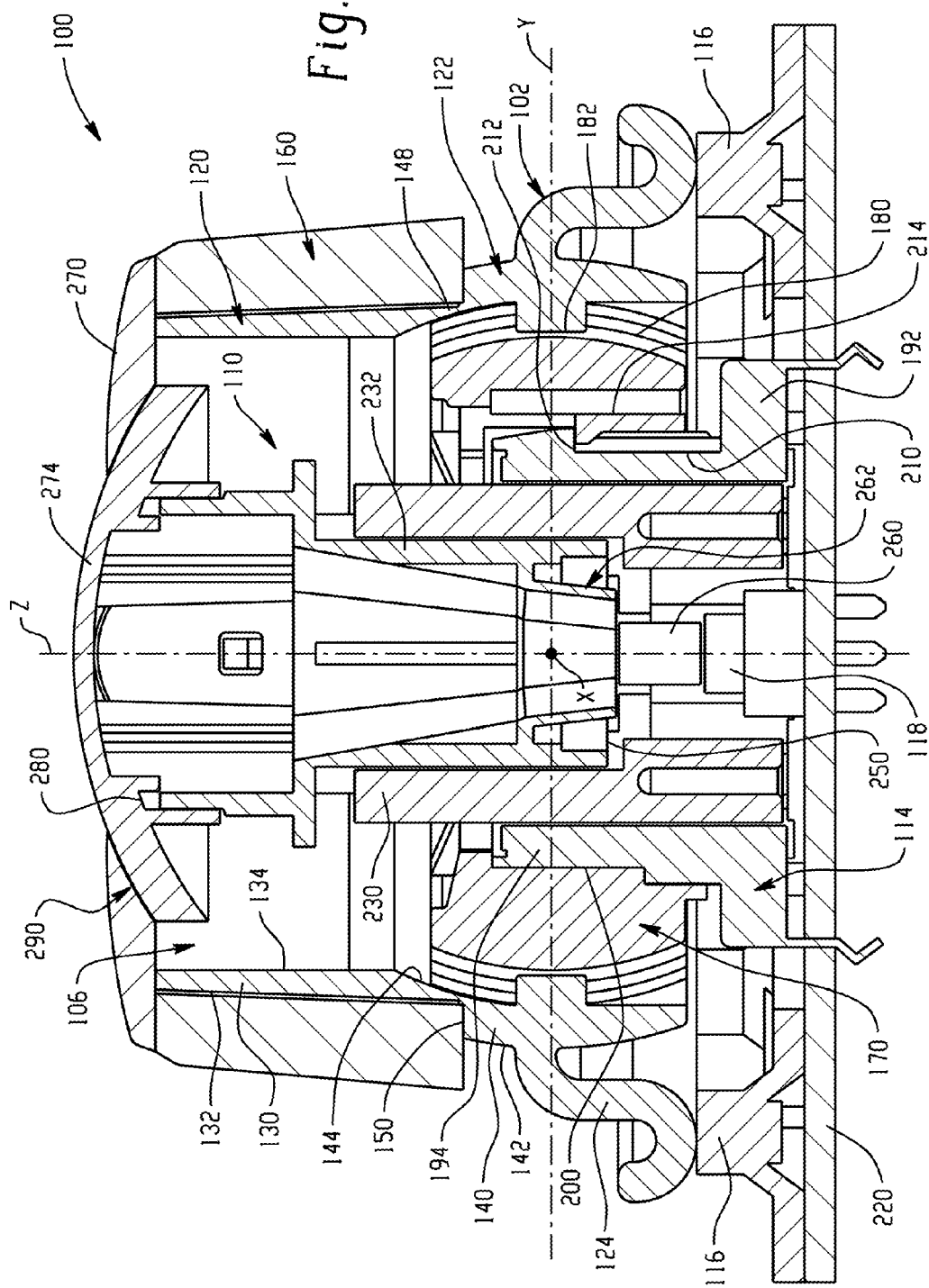
FIG. 3 is a cross-sectional view of the multi-position switch assembly of FIG. 1, the multi-position switch assembly being in a non-activated or rest position.
Figure 4:
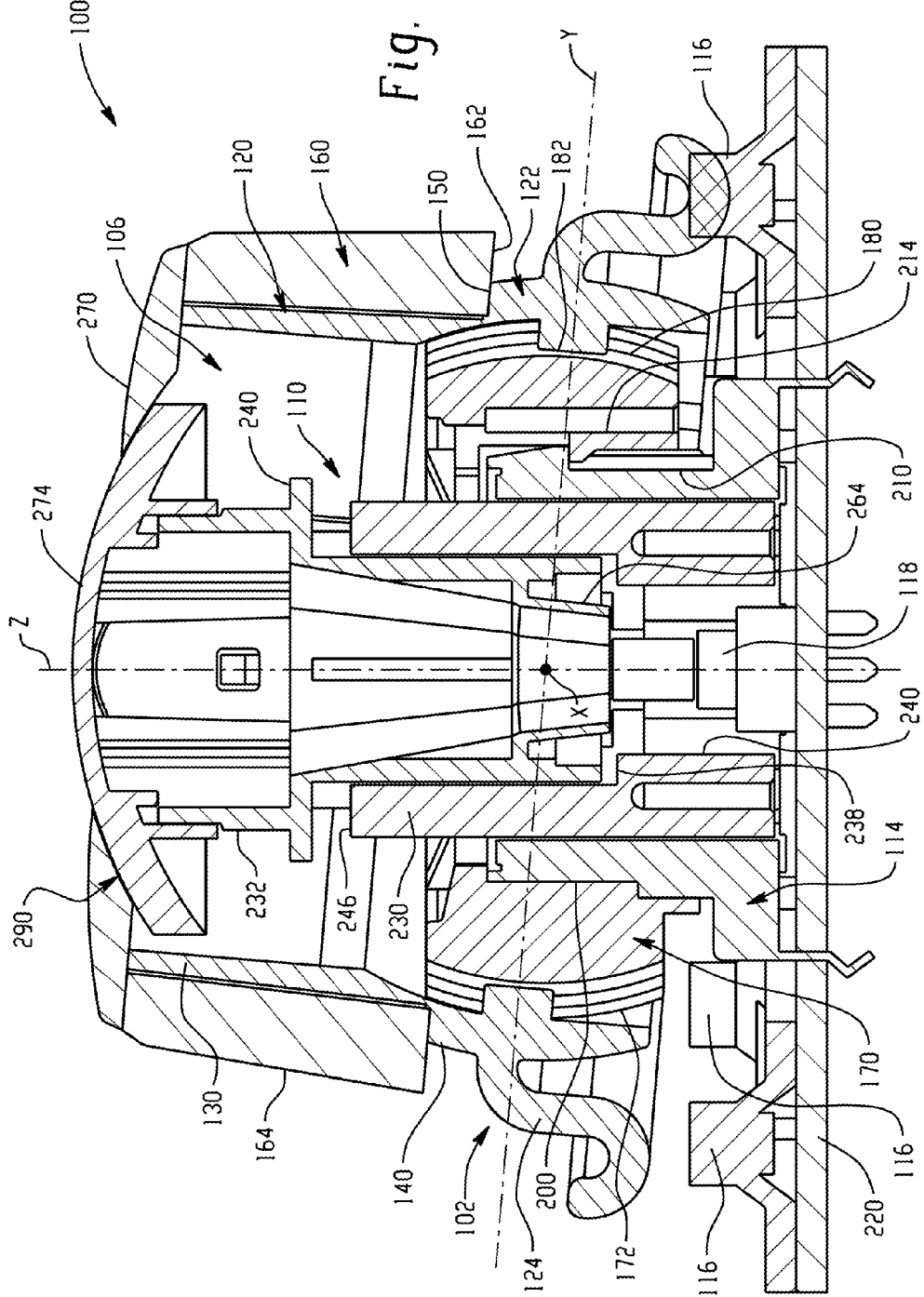
FIG. 4 is a cross-sectional view of the multi-position switch assembly of FIG. 1, the multi-position switch assembly being in an activated condition.
Figure 5:
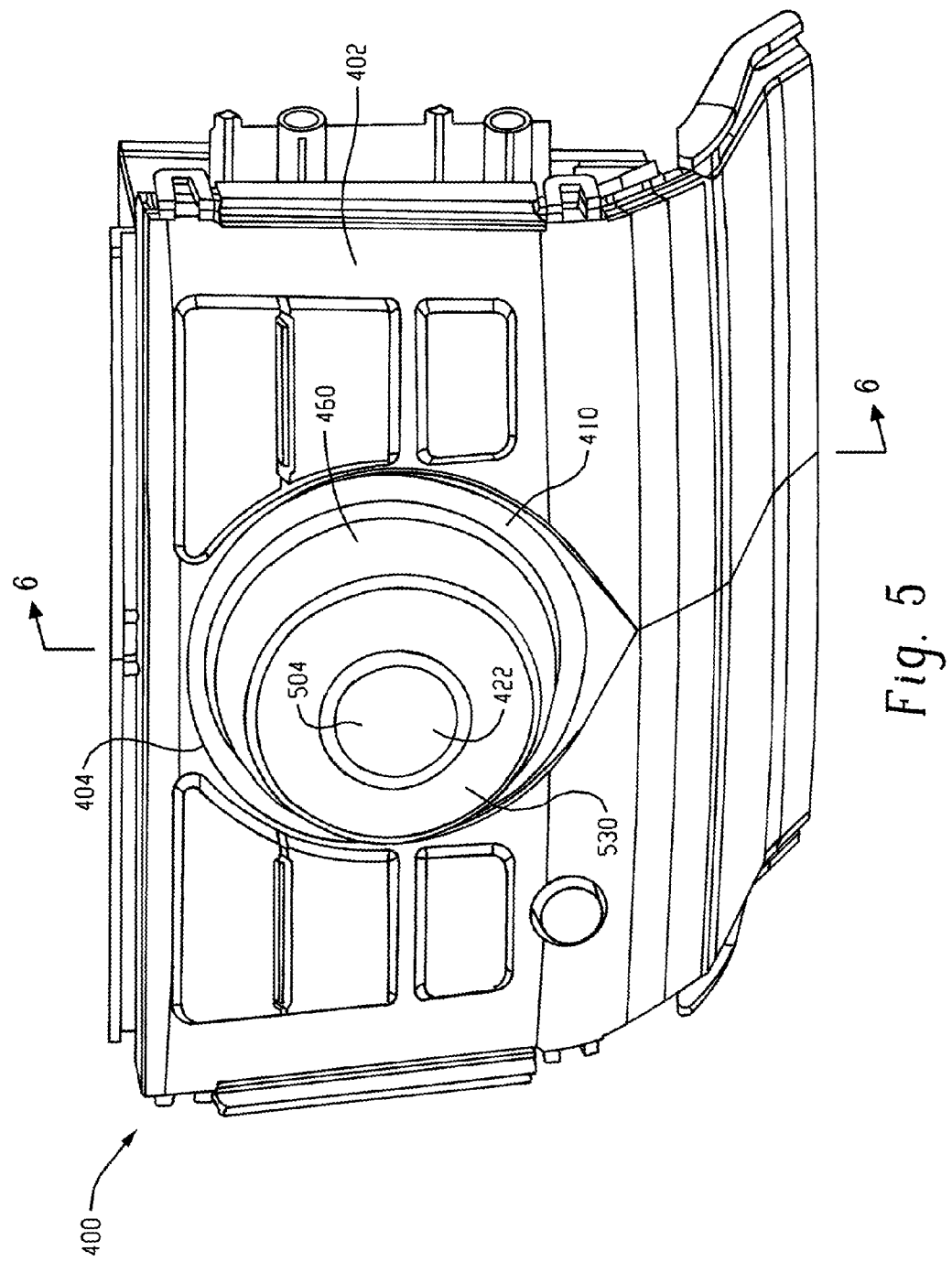
FIG. 5 is a perspective view of an another exemplary embodiment multi-position switch assembly for controlling a display screen, the multi-position switch assembly being mounted to a housing, such as an instrument panel of a vehicle.

With reference to FIGS. 3 and 4, the rocker 104 has an annular shape and includes a first section 120 and a second section 122. A radial flange 124 extends outwardly from the second section. Spherical rotation of the rocker 102 causes the radial flange 124 to activate the first input device 116, which can be a plurality of switches spaced radially outward from the Z-axis. The radial flange 124 further limits movement of the switch assembly within a housing (not shown), such as an instrument panel of a vehicle. In the depicted embodiment, a portion of the radial flange 124 is generally J-shaped; although, this is not required. As shown in FIG. 3, the first section 120 of the rocker 102 is defined by a wall 130. The wall includes an outer surface 132 which is slightly angled toward the radial flange 124 and an inner surface 134 which extends generally vertically along the Z-axis. The second section 122 of the rocker is defined by a wall 140. As shown, the wall 140 has a generally spherical shape and includes a generally convex outer surface 142 and a generally concave inner surface 144. Although, it should be appreciated that the outer surface 142 can be generally vertical. The inner surface 144 of the wall 140 transitions to the inner surface 134 of the wall 130 at a higher point than the transition of the outer surface 142 of the wall 140 to the outer surface 132 of the wall 130.

The rocker 102 further includes a reduced dimension portion 148 which generally separates the first section 120 from the second section 122. This reduced dimension portion 148 defines a shelf 150 which can accommodate an annular gripping member 160. As shown, the gripping member 160 is attached to the first section 120 of the rocker 102 for ease of handling of the rocker 102 by an operator. A bottom wall 162 of the gripping member 160 generally rests on the shelf 150. The gripping member substantially surrounds the first section 120 of the rocker 102 and includes an outer wall 164 which is angled generally away from the Z-axis. The bottom wall 162 of the gripping member 160 and the radial flange 124 can limit the spherical rotation of the rocker 102 about the X and Y axes; although, this is not required.

With continued reference to FIGS. 3 and 4, the multi-position switch assembly 100 further includes a ring or holder 170 positioned within the interior space 106 of the rocker 102. The ring 170 is engaged by the rocker 102 for rotation therewith about the Z-axis. The ring 170 includes an outer surface 172 configured to matingly engage the inner surface 144 of the second section 122 of the rocker 102. Particularly, as the rocker 102 spherically rotates for actuation of the first input device 116, the inner surface 144 of the rocker rides along the outer surface 172 of the ring 170 during the spherical movement of the rocker 102. To provide for such spherical or tilting movement of the rocker 102 relative to the ring 170, the outer surface 172 of the ring has a generally convex shape. As shown, the ring has a generally spherical shape. The ring 170 includes at least one guide 174 and the rocker 102 is configured to spherically rotate via the at least one guide. In the depicted exemplary embodiment, the at least one guide 174 is a linear groove 180 and the inner surface 144 of the spherical wall 140 of the rocker 102 second section 122 includes a projection 182 which is received within the linear groove 180 for moveable engagement between the rocker 102 and the ring 170. As shown, the linear groove 180 extends along the entire outer surface 172 of the ring 170 from a top edge to a bottom edge; although, this is not required. Further, in the depicted embodiment, four linear grooves 180 are provided on the ring 170, the linear grooves being circumferentially spaced apart from each other. It should be appreciated that more or less than four linear grooves 180 can be provided on the ring 170 for spherical or tilting movement between the rocker 102 and the ring 170. As shown in FIG. 4, as the rocker 102 spherically rotates, the tab 182 of the rocker 102 rides along a surface of the linear groove 180 of the ring 170 thereby allowing for smooth movement of the rocker 102 on the ring 170.

Figure 2:
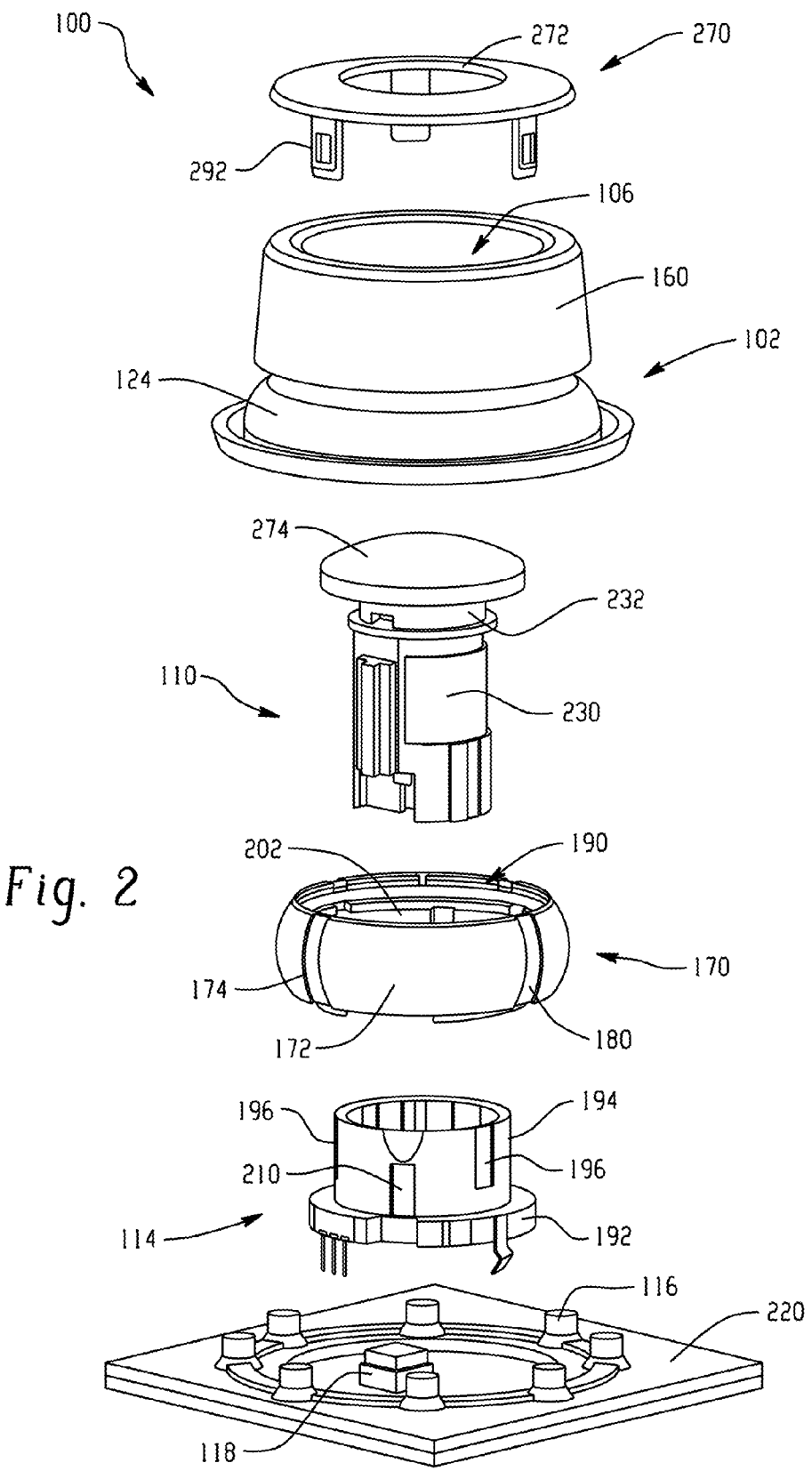
FIG. 2 is an exploded perspective view of the multi-position switch assembly of FIG. 1.

The encoder 114 for detecting the rotational angle or position of the rocker 102 is positioned at least partially within an interior space 190 defined by the ring 170. As is well known, the encoder 114 can be an electro-mechanical device used to convert the angular position of the rocker 102 to an analog or digital code making it an angle transducer. The encoder includes a base 192 and a cylindrical member 194 extending upwardly from the base. As shown in FIGS. 2-4, the cylindrical member 194 can includes circumferentially spaced grooves 196 which are engaged by ribs 200 extending inwardly from an interior surface 202 of the ring 170. As shown, the grooves 196 extend from an upper section of the cylindrical member 194 of the encoder 114 and are spaced from the base 192. The cylindrical member 194 also includes at least one second groove 210 which extends from a lower portion of the cylindrical member. The second groove 210 at least partially defines a shelf 212 which is engaged by a second rib 214 extending inwardly from the inner surface 202 of the ring 170. The engagement between the shelf 212 and the second rib 214 mounts the ring 170 to the encoder 114. It should be appreciated that alternative manners for mounting the ring 170 onto the encoder 114 are contemplated.

The base 192 of the encoder 114 is mounted to a printed circuit board 220 which extends essentially perpendicular to the Z-axis of rotation of the rocker 102. The first and second input devices 116 and 118 are arranged on the printed circuit board. Each of the first and second input devices can be momentary-contact switches; although, this is not required. For example, it should be appreciated that in lieu of printed circuit board tack switches 116, 118, a rubber contact sheet can be provided. In the depicted embodiment, eight first input devices 116 are circumferentially spaced about the Z-axis and are provided on the printed circuit board 220. The second input device 118 is surrounded by the plurality of first input devices 116 and is positioned adjacent to the axis of rotation 104 of the rocker 102. The spherical rotation or tilting of the rocker 102 in a predetermined direction actuates the first input devices 116 to actuate side-side/up-down/diagonal movement of an on-screen cursor of the display screen. An LED (not visible) can be provided on the printed circuit board 220 adjacent the second input device 118 for illuminating the pushbutton 110.

With continued reference to FIGS. 2-4, the pushbutton 110 extends through the interior space 106 of the rocker 102, the interior space 190 of the ring 170 and the encoder 114. The pushbutton 110 is fixed with respect to rotation relative to the rocker 102 and is movable linearly in a direction of the Z-axis. The pushbutton 110 includes an outer member 230 and an inner member 232 linearly displaceable relative to the outer member 230 for selectively actuating the second input device 118. To limit the linear movement of the inner member 232, the outer member 230 can include a ledge 238 which extends radially inward from an inner surface 240 of the outer member, and the inner member 232 can include a flange 240 which extends outwardly from an outer surface of the inner member 232. During movement of the inner member 232 relative to the outer member 230, the flange abuts a top surface 246 of the outer member 230 and a bottom wall 250 of the inner member 232 abuts the ledge of the outer member.

The inner member 232 includes a projection 260 which extends along the axis of rotation 104. As shown in FIG. 3, an end portion of the projection 260 extends below the bottom wall 250 of the inner member 232 for actuating the second input device 118 upon depression of the pushbutton 110. The inner member 232 further includes a cup-like member 262 which at least partially surrounds the projection 260. The cup-like member is defined by a wall 264 which is angled inwardly toward the Z-axis. The cup-like member 262 can be resilient such that as the projection 260 is depressed downwardly within the inner member 232, the inner member is displaced linearly within the outer member 230 and the wall 264 of the cup-like member 262 is forced outwardly. As the downward force applied to the pushbutton 110 to actuate the second input device 118 is removed, the resilient nature of the cup-like member 262 forces the projection 260 upwardly, which, in turn, moves the inner member 232 upwardly within the outer member 230.

A garnish member 270 can be mounted to the first section 120 of the rocker 102 and is configured to limit linear displacement of the pushbutton 110. The garnish member 270 includes a central opening 272 which allows a portion of the pushbutton 110 to extend therethrough. Particularly, the pushbutton 110 includes an arcuate shaped button 274 which is secured to an upper portion of the inner member 232. A bottom wall 280 of the button 274 includes a groove 280 for receiving the inner member. A spherical interface 290 is provided between the garnish member 270 and the button 274 of the pushbutton 110. As shown in FIG. 4, this allows the garnish member 270 to move along the button 274 as the rocker 102 spherically rotates about the ring 170. The spherical interface also provides for a smooth transition between the garnish member 270 and the pushbutton 110. To secure the garnish member 270 to the rocker 102, the garnish member includes spaced apart downwardly extending tabs 292 which are configured to engage the inner surface 134 of the rocker 102; although, alternative manners for securing the garnish member to the rocker 102 are contemplated. Further, the cup-like member 262 can guide light generated from the LED located on the printed circuit board 220 towards the button 274 for illuminating the button.

The economical multi-position switch assembly 100 allows for spherical rotation via the guides 174 located on ring 170. The spherical rotation of the rocker 102 actuates the first input devices 116 located on the printed circuit board 220 to actuate the movement, for example, of an on-screen cursor of a display located on a vehicle. The multi-position switch assembly 100 also allows for a center illuminated pushbutton 110 to be used as an enter or select switch. The depicted multi-position switch assembly 100 reduces the complexity relative to conventional switches and also reduces the number of parts currently provided with conventional operating switches.

When an operator tilts or spherically rotates the rocker 102 in an arbitrary direction by a predetermined amount by urging the rocker 102 downwardly along the ring 170, the radial flange 124 actuates one of the first input devices 116. When a display system is arranged by using the multi-position switch assembly 100, the operator can control a plurality of kinds of functions by operating the rocker 102. For example, if the display system is a vehicle navigation system, when a map displayed on the display screen is to be moved, the rocker 102 need only to be tilted or spherically rotated in the direction towards which the map is to be moved. When the map is to be enlarged or reduced, the rocker 102 need only to be rotated clockwise or counterclockwise. Further, when a present position is to be input to the map, the pushbutton 110 need only to be depressed to actuate the second input device 118.

It should be noted that when the tilting or spherical force applied to the rocker 102 to tilt the rocker is removed, the rocker 102 can be forcibly returned to its non-actuated position by a resilient force of a bias mechanism or spring (not shown) of the first input device 116. Thus, the rocker 102 is automatically returned to the initial position shown in FIG. 3. Further, when the downward force applied to the pushbutton 110 is removed, the pushbutton 110 can automatically returned to the initial position by the resilient force of the second input device 118 and/or by the engagement of the cup-like member 262 with the projection 260.

With reference now to FIGS. 5-11, another exemplary embodiment of a multi-position switch assembly 400 for controlling a vehicle display system is illustrated. Similar to the multi-position switch assembly 100 described above, the multi-position switch assembly 400 comprises a housing 402 defining an opening 404. As shown, the housing can be an instrument panel located in a vehicle; although, this is not required. An annular rocker 410 is at least partially arranged within the housing opening. The rocker 410 is configured to spherically rotate about one of an X-axis and a Y-axis and tilt in a predetermined direction relative to the X-axis and Y-axis. A ring or holder 420 is positioned within the rocker 410 and configured to rotate therewith about the Z-axis. A pushbutton 422 extends through the rocker 410 and the ring 420. The pushbutton 422 is fixed with respect to rotation and is movable linearly in a direction of the Z-axis. A encoder 424 is at least partially surrounded by the ring 420 for detecting a rotation angle of the rocker 410 and outputting a signal to a display screen of the vehicle display system. A plurality of first input devices or momentary-contact switches 430 are provided on a printed circuit board 432. Each first momentary-contact switch 430 is actuated by a tilting movement of the rocker 410. A second input device or momentary-contact switch 434 is actuated by the linear movement by the pushbutton 422.

Figure 6:
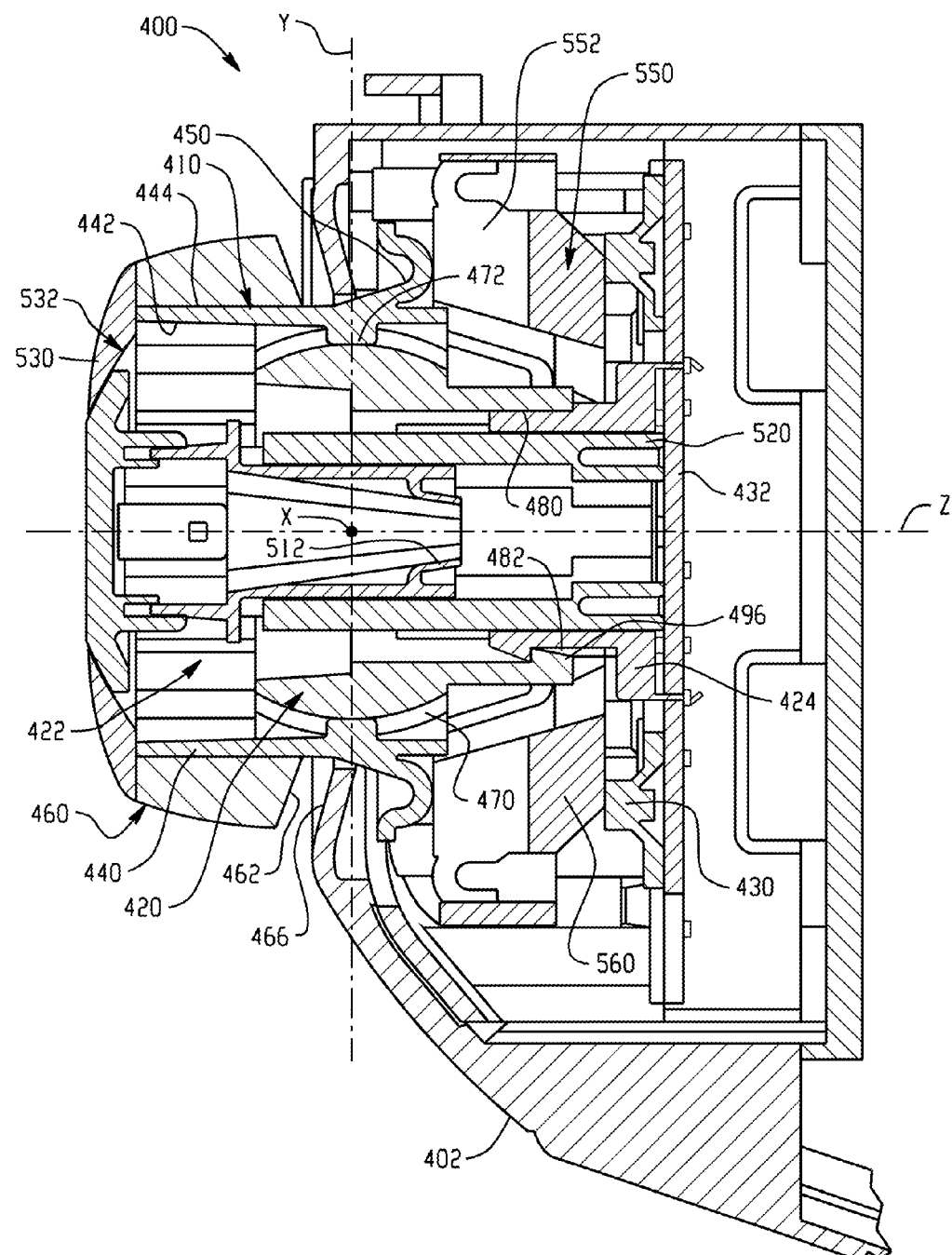
FIG. 6 is a cross-sectional view of the multi-position switch assembly of FIG. 5 taken generally along line 6-6 of FIG. 5.

With reference to FIG. 6, the rocker 410 includes a wall 440 having an inner surface 442 and an outer surface 444. A flange 450 extends radially from a bottom portion of the wall 440 of the rocker 410 for actuating the plurality of first momentary-contact switches 430. The radial flange can be generally J-shaped and is located within the housing 402. In the non-actuated position shown in FIG. 6, an end of the flange 450 engages an interior surface of the housing 402. This can limit the spherical or tilting movement of the rocker 410 within the housing 402.

An annular gripping member 460 can be attached to an end portion of the rocker 410 for ease of handling of the rocker 410 by an operator. A bottom wall 462 of the gripping member 460 is angled generally towards the Z-axis and has a shape similar to a shape of a depressed portion 466 of the housing 402 which transitions into the opening 402. In the actuated position, the bottom wall 462 of the gripping member 460 can contact the depressed portion 466 of the housing 402 to further limit the spherical movement or tilting movement of the rocker 410.

Similar to the previous embodiment, the ring 420 is positioned within the interior space of the rocker 410 and is engaged by the rocker 410 for rotation therewith about the Z-axis. The ring 420 can have a generally spherical shape and includes linear extending guides 470 which are cooperatively engaged by projections or tabs 472 extending inwardly from an interior surface of the rocker 410. The tabs 472 ride along the guides 470 as the rocker 410 spherically rotates about the ring 420.

Figure 8:
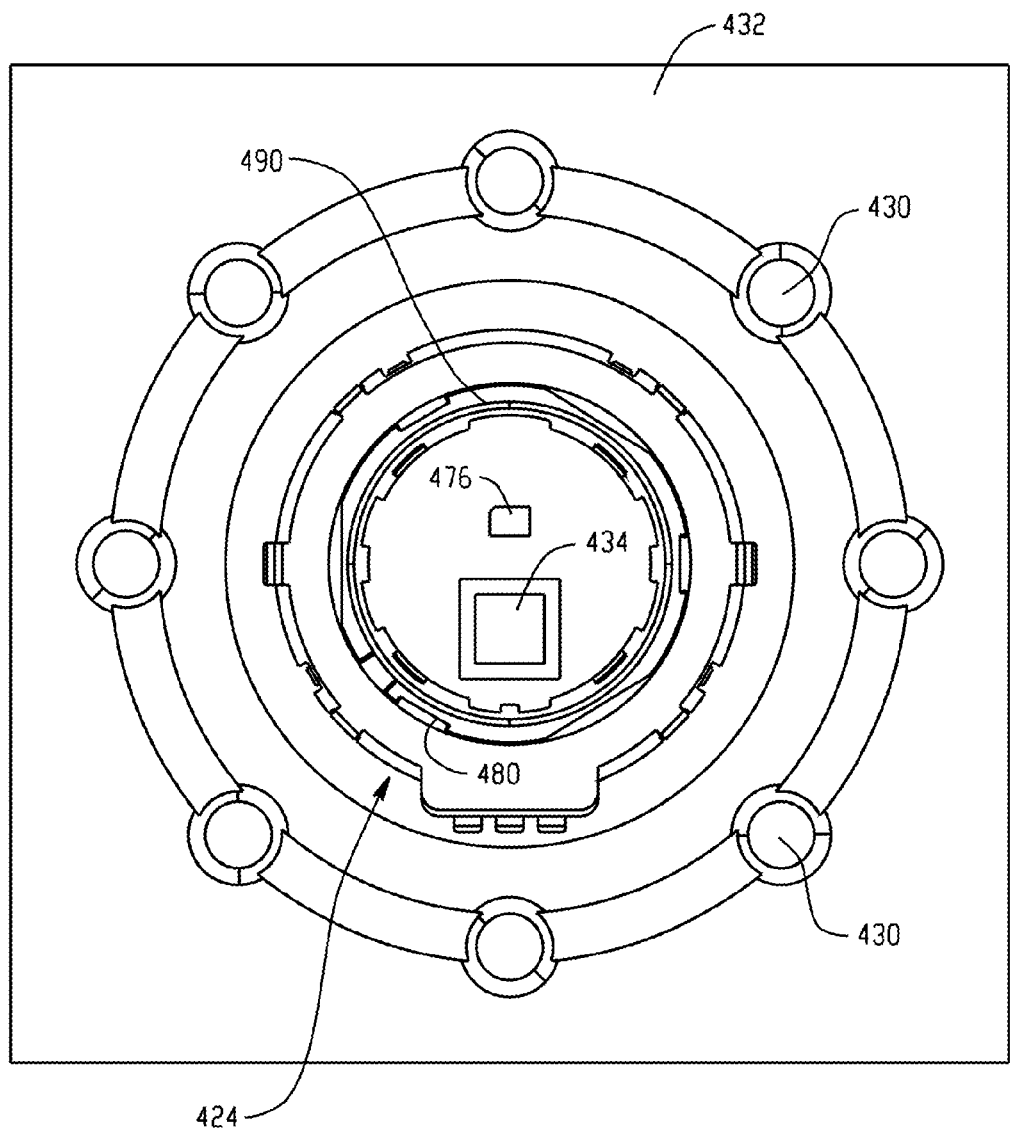
FIG. 8 is a top plan view of an encoder and input device(s) for the multi-position switch assembly of FIG. 5.

With additional reference to FIG. 8, the encoder 424 is mounted to the printed circuit board 432 and at least partially inside the ring 420. The plurality of first momentary-contacts 430 are circumferentially spaced on the printed circuit board 432 about the Z-axis. The second momentary-contact switch 432 is enclosed by the encoder 424. An LED 476 can be provided on the printed circuit board adjacent the second momentary-contact switch 432 for illuminating the pushbutton 422. The encoder 424 has a confirmation similar to encoder 114 and includes first and second grooves 480 and 482, respectively, disposed about a cylindrical member 490. The first grooves 480 are engaged by the ring 420. In the depicted embodiment, the ring 420 includes a tab 496 for engaging the second groove 482 of the encoder 424. This engagement mounts the ring 420 onto the encoder 424.

Figure 7:
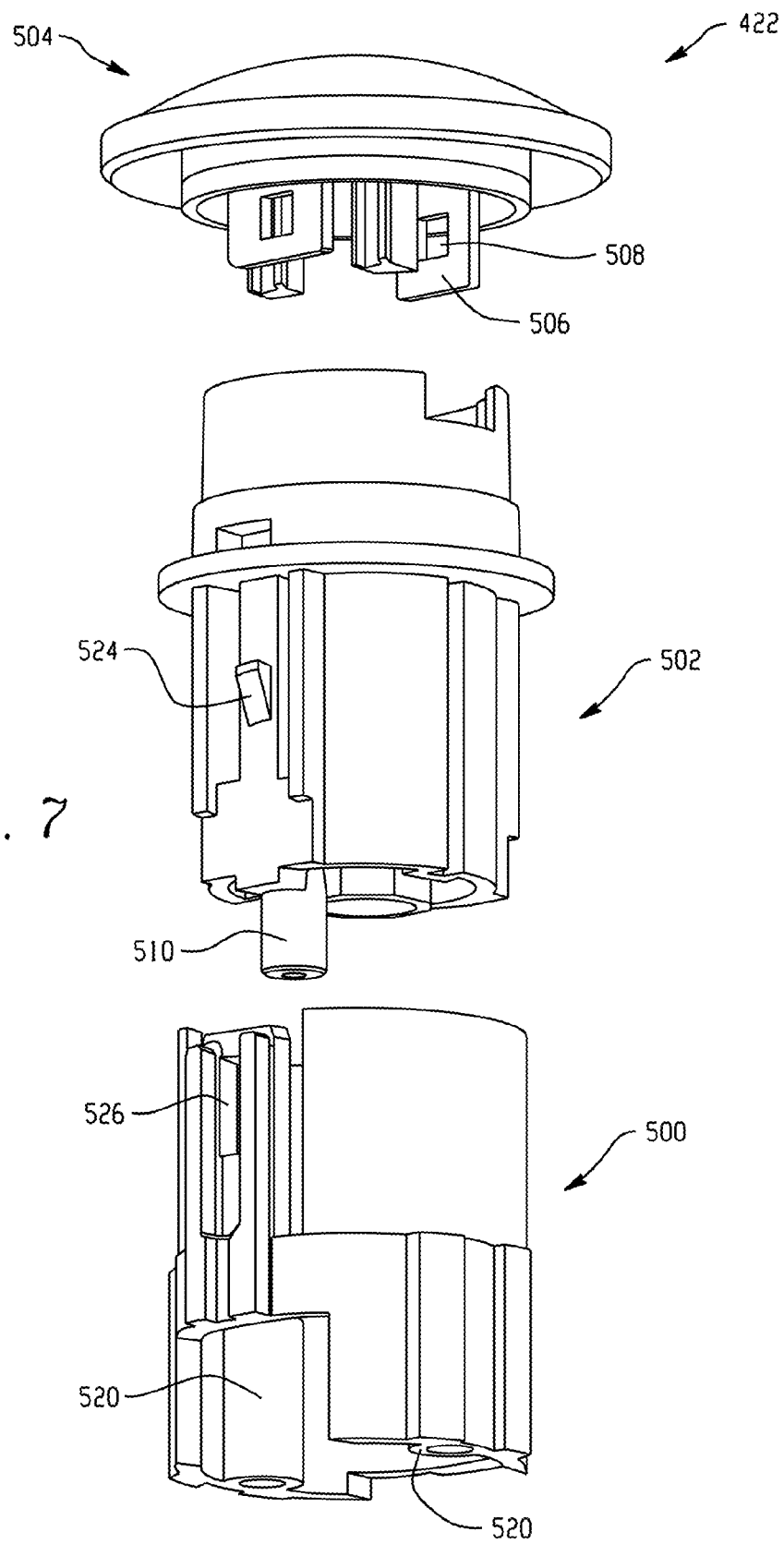
FIG. 7 is an exploded perspective view of the multi-position switch assembly of FIG. 2.

As shown in FIGS. 6 and 7, the pushbutton 422 includes an outer member 500 at least partially received within the encoder 424 and an inner member 502 linearly displaced relative the outer member 500 for selectively actuating the second momentary-contact switch 118. A button 504 is secured to the inner member 502 via downwardly extending tabs 506. Each tab includes an opening 508 for receiving a tab (not shown) which extends inwardly from an inner surface of the inner member 502. The inner member 502 surrounds a projection 510, which is configured to engage the second momentary-contact switch 434 when a downward force is applied to the pushbutton 422. Similar to the previous embodiment, the inner member includes a cup-like member 512 which guides the projection 510 downwardly within the pushbutton 422. The cup-like member 422 can guide light generated from the LED towards the pushbutton 422 for illuminating the pushbutton. The outer member 500 includes inwardly spaced bosses 520 which allow the outer member to be secured to the printed circuit board 432. To mount the inner member 502 to the outer member 500, the inner member can include a tab 524 which engages a slotted opening 526 located on the outer member. The linear dimension of the slotted opening 526 limits the displacement of the inner member 502 relative to the outer member 500. A garnish member 530 is mounted to an end portion of the rocker 410 and is configured to limit linear displacement of the pushbutton 422. The garnish member 530 provides a spherical interface 532 between the button 504 and an inner surface of the garnish member 530 thereby allowing the garnish member to move along the button as the rocker 410 spherically rotates about the ring 420.

Figure 9:
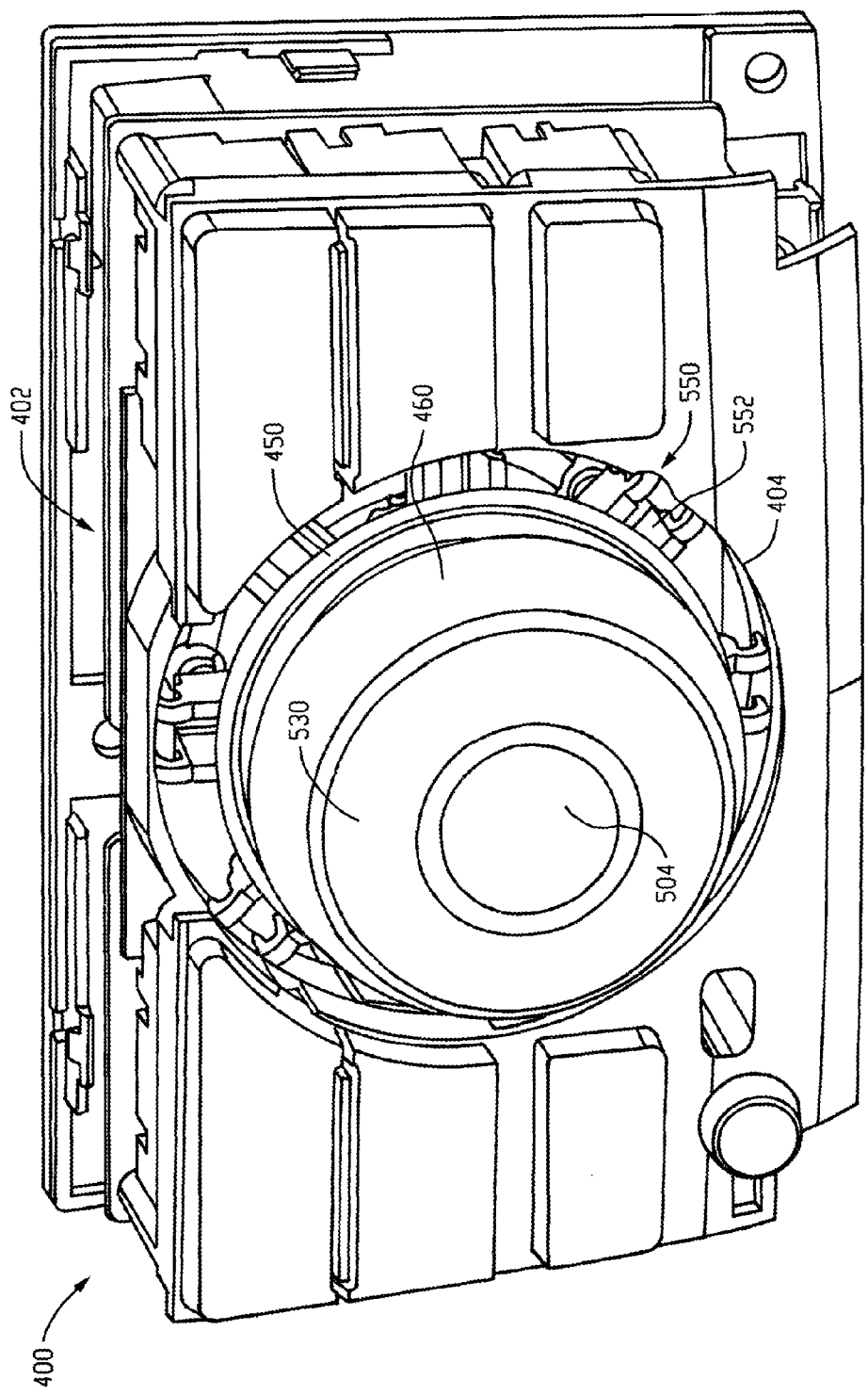
FIG. 9 is a perspective view of the multi-position switch assembly of FIG. 5 including a bias mechanism operatively positioned within the housing.
Figure 10:
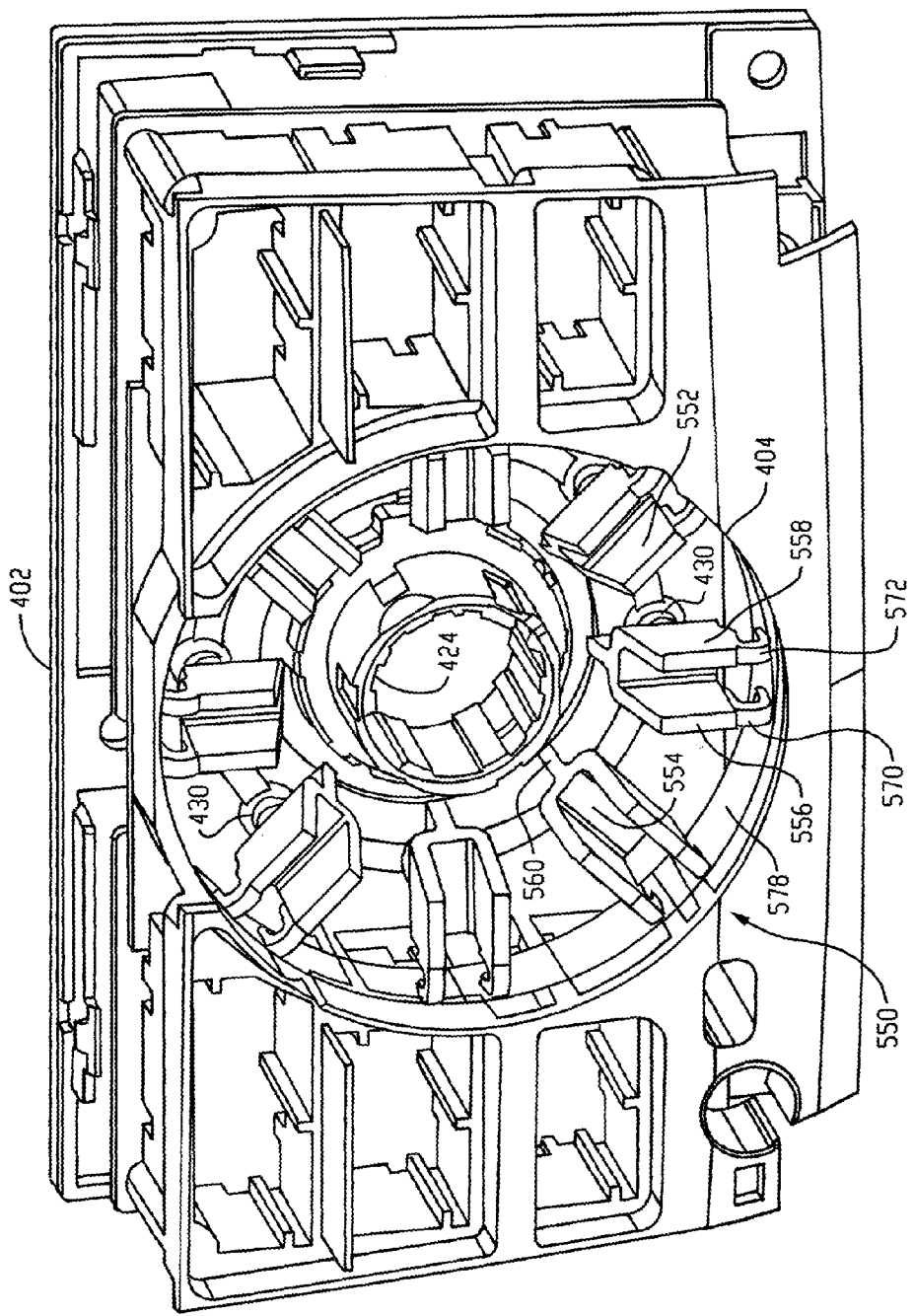
FIG. 10 is a partial perspective view of the multi-position switch assembly of FIG. 9.
Figure 11:
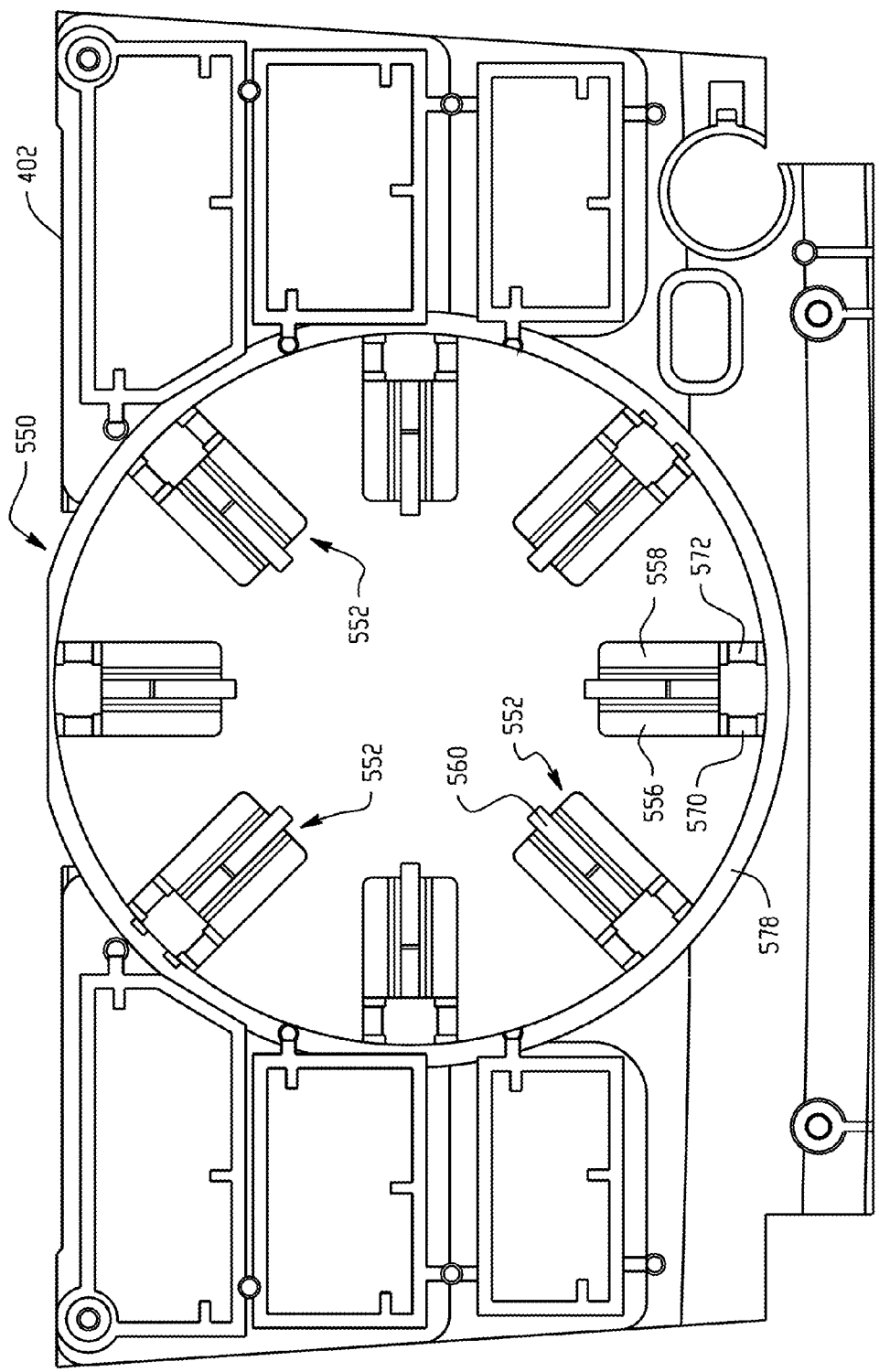
FIG. 11 is a rear elevational view of the multi-position switch assembly FIG. 10.

With reference now to FIGS. 9-11, a bias mechanism 550 is operably positioned between the rocker 410 and the plurality of first momentary-contact switches 430. Spherical movement of the rocker 410 engages the bias mechanism 550 which, in turn, activates one of the first momentary-contact switches 430. The bias mechanism 550 is configured to urge the rocker 410 back to a non-actuated position. The bias mechanism 550 is arranged in the housing 402 and includes a plurality of spaced apart contact members or arms 552 hingedly connected to the housing 402. Each arm 552 is configured to activate one of the first momentary-contact switches 430. The bias mechanism 550 reduces wear on the contact switches from an auto return of the switch. Particularly, as indicated above with respect to the first embodiment, the resilient nature of the input devices 430 can move the rocker 410 back to a non-actuated position. However, over time, the first momentary-contact switches 430 can wear. The bias mechanism 550 is configured to reduce the wear on the first momentary-contact switches 430 by biasing or urging the rocker 410 back to its non-actuated position. It should be appreciated that the bias mechanism 550 could be used in conjunction with the multi-position switch assembly 100 described above.

As shown in FIG. 10, each arm 552 includes a base 554, first and second walls 556 and 558, respectively, extending in a first direction from the base 554 and a third wall 560 extending in a second direction from the base. As shown, the arms 552 have a fork-like conformation; although, this is not required. Each of the first and second walls 556, 558 includes a hooked portion 570, 572 which pivotally connect the arm 550 to the housing 402. Particularly, the hooked portions 570, 572 are secured to a ring-like member 578 which is mounted within the opening 404 of the housing 402. The third wall 560 is configured to engage the first momentary-contact switch 430. In the depicted embodiment, the third wall 560 has a generally trapezoidal conformation; although, this is not required. A tilting movement of the rocker 410 engages one of the arms 552 of the bias mechanism 550 which, in turn, actuates one of the plurality of first momentary-contact switches 430. Each arm 552 extends inwardly from the ring-like member 578 towards the rocker 410 such that the third wall 560 of each arm only contacts a portion of the momentary-contact switch 430. The arm 552 serves as a spring such that when the arm is engaged by the rocker 410 to actuate a first input device 430, the arm 552 presents a biasing force against the rocker 410. When the rocker 410 is released, the arm 552 urges the rocker 410 back to the non-actuated position.

The economical multi-position switch assembly 400 allows for spherical rotation of the rocker 410 about the ring 420 via the guides 470 located on the ring. The spherical rotation actuates at least one of the first input devices 430 to actuate movement between different menus located on a display screen of a vehicle display system. By way of example, in use, a plurality of menus can be displayed on the display screen. A selection can be made among these menus by spherically rotating the rocker 410 about the ring 420. A decision can be made on the menus by depressing the pushbutton 422. A decided menu can be modified by rotation of the rocker 410. The pushbutton 422 can be used as an enter or select switch and selectively actuates the second input device 432. Again, the multi-position switch assembly 400 reduces the complexity relative to conventional operating devices and also significantly reduces the number of parts associated with the switch.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A multi-position switch assembly for controlling a vehicle display screen comprising:
    a rocker configured to spherically rotate, the rocker defining an interior space;
    a pushbutton separate from the rocker and extending through the interior space of the rocker, the pushbutton being fixed with respect to the rocker as the rocker rotates with respect to the pushbutton and being movable linearly relative to the rocker;

a ring positioned within the interior space of the rocker, the ring being engaged by the rocker for rotation therewith, wherein the ring includes an outer surface configured to matingly engage an inner surface of the rocker, the inner surface of said rocker riding along the outer surface of the rotary ring during spherical movement of the rocker about the ring;

a first input device actuated by the spherical movement of the rocker; and a second input device actuated by the linear movement of the pushbutton.

2. The multi-position switch of claim 1, wherein the rocker includes a radial flange for activating the first input device.

3. The multi-position switch of claim 1, wherein the outer surface of the ring has a generally convex shape.

4. The multi-position switch assembly of claim 1, wherein the outer surface of the ring includes at least one of a linear groove and a projection and the inner surface of the rocker includes the other of the groove and the projection for cooperative engagement between the rocker and the ring.

5. The multi-position switch assembly of claim 1, wherein the ring has a generally spherical shape.

6. The multi-position switch assembly of claim 1, wherein the rocker further includes an annular gripping member attached to an end portion of the rocker for ease of handling of the rocker by an operator.

7. The multi-position switch assembly of claim 1, further comprising an encoder for detecting a rotation angle of the rocker, wherein the encoder defines an interior space, the pushbutton including an outer member at least partially received within the interior space of the encoder and an inner member linearly displaceable relative to outer member for selectively actuating the second input device.

8. The multi-position switch assembly of claim 1, further comprising a bias mechanism operatively positioned between the rocker and the first input device, wherein spherical movement of the rocker engages the bias mechanism which, in turn, activates the first input device, the bias mechanism urging the rocker back to a non-actuated position.

9. The multi-position switch assembly of claim 8, further comprising a housing, the rocker being at least partially arranged in the housing, the bias mechanism being hingedly connected to the housing.

10. The multi-position switch assembly of claim 9, wherein the bias mechanism includes an arm configured to activate the first input device.

11. A multi-position switch assembly for controlling a vehicle display screen comprising:

a housing;

a ring positioned within the housing and configured to rotate therein;

an annular rocker at least partially arranged within the housing, the rocker at least partially surrounding the ring, the rocker being configured to rotate with the ring and tilt in a predetermined direction about the ring, wherein the ring includes an outer surface configured to matingly engage an inner surface of the rocker, the inner surface of the rocker riding along the outer surface of the ring during spherical movement of the rocker;

a pushbutton extending through the rocker and ring, the pushbutton being fixed with respect to rotation and being movable linearly relative to the rocker;

a plurality of first momentary-contact switches, each first momentary-contact switch being actuated by a tilting movement of the rocker; and a second momentary-contact switch actuated by the linear movement of the pushbutton.

12. The multi-position switch assembly of claim 11, further comprising a bias mechanism arranged in the housing and operatively positioned between the rocker and the plurality of first momentary-contact switches, wherein a tilting movement of the rocker engages the bias mechanism which, in turn, activates at least one of the plurality of first momentary-contact switches, the bias mechanism urging the rocker back to a non-actuated position.

13. The multi-position switch assembly of claim 12, wherein the bias mechanism includes a plurality of an inwardly extending arms, each arm being pivotally connected to the housing and configured to activate one of the plurality of first momentary-contact switches.

14. The multi-position switch of claim 11, further comprising a garnish member mounted to an end portion of the rocker, the garnish member and the pushbutton together defining a spherical interface which allows the garnish member move along the pushbutton as the rocker spherically rotates about the ring.

15. The multi-position switch of claim 11, wherein the ring outer surface has a generally spherical shape.

16. A multi-position switch assembly for controlling a vehicle display screen comprising:

an annular rocker;

a ring including at least one guide, the rocker configured to spherically rotate about the ring via the at least one guide, the ring being positioned within the rocker for rotation therewith about an axis of rotation; and a pushbutton fixed with respect to rotation of the rocker and the ring about the axis of rotation and being movable linearly relative to the rocker.

17. The multi-position switch assembly of claim 16, further comprising a bias mechanism hingedly positioned between the rocker and a plurality of spaced apart input devices, the bias mechanism configured to activate one of the plurality of input devices via spherical movement of the rocker.

18. The multi-position switch assembly of claim 17, wherein the bias mechanism includes a plurality of spaced apart contact members, one contact member for each input device.

19. The multi-position switch assembly of claim 16, wherein the ring includes a generally convex outer surface.

20. The multi-position switch assembly of claim 19, wherein the rocker includes a generally concave inner surface for matingly engaging the outer surface of the ring.

21. A multi-position switch assembly for controlling a vehicle display screen comprising:

an annular rocker including an inner surface;

a ring positioned within the rocker for rotation therewith about an axis of rotation, the ring including a generally convex outer surface having at least one guide, the inner surface of the rocker configured to matingly engage and ride along the outer surface of the ring such that the rocker spherically rotates about the ring via the at least one guide; and a pushbutton fixed with respect to rotation about the axis of rotation and being movable linearly relative to the rocker.

* * * * *